United States Patent
Breault

(10) Patent No.: US 8,298,725 B2
(45) Date of Patent: Oct. 30, 2012

(54) ELECTRODE SUBSTRATE FOR ELECTROCHEMICAL CELL FROM CARBON AND CROSS-LINKABLE RESIN FIBERS

(75) Inventor: Richard D. Breault, North Kingstown, RI (US)

(73) Assignee: UTC Power Corporation, South Windsor, CT (US)

( * ) Notice: Subject to any disclaimer, the term of this patent is extended or adjusted under 35 U.S.C. 154(b) by 649 days.

(21) Appl. No.: 12/311,483

(22) PCT Filed: Mar. 29, 2007

(86) PCT No.: PCT/US2007/007554
§ 371 (c)(1),
(2), (4) Date: Mar. 31, 2009

(87) PCT Pub. No.: WO2008/051280
PCT Pub. Date: May 2, 2008

(65) Prior Publication Data
US 2010/0035126 A1   Feb. 11, 2010

(51) Int. Cl.
*H01M 4/00*        (2006.01)
(52) U.S. Cl. ...................................................... 429/523
(58) Field of Classification Search .................. None
See application file for complete search history.

(56) References Cited

U.S. PATENT DOCUMENTS

| | | | | |
|---|---|---|---|---|
| 4,851,304 | A | * | 7/1989 | Miwa et al. .................... 429/534 |
| 5,254,396 | A | * | 10/1993 | Takemura et al. ............ 442/241 |
| 2004/0005493 | A1 | * | 1/2004 | Tanno ............................. 429/34 |
| 2005/0126395 | A1 | * | 6/2005 | Blackburn et al. .............. 96/108 |

FOREIGN PATENT DOCUMENTS
EP     0892101 A1 *  1/1999

OTHER PUBLICATIONS screenshot of http://www.kynol.com/NewFiles/kynol%20fibers%20with%20pics.html accessed on Jan. 18, 2012.*
Lewis, Richard J., Hawley's Condensed Chemimcal Dictionary, 2007, Wiley and Sons, Inc., Fifteenth Edition, p. 1233.*

* cited by examiner

*Primary Examiner* — Patrick Ryan
*Assistant Examiner* — Wyatt McConnell
(74) *Attorney, Agent, or Firm* — M. P. Williams

(57) ABSTRACT

A method of making an electrochemical cell electrode substrate includes creating an aqueous or dry mixture of chopped carbon fibers, chopped cross-linkable resin fibers that are still fuseable after being formed into a felt, such as novolac, a temporary binder, such as polyvinyl alcohol fiber or powder, forming a non-woven felt from either an aqueous suspension of the aqueous mixture or an air suspension of the dry mixture, by a non-woven, wet-lay or dry-lay, respectively, felt forming process, a resin curing agent, such as hexamethylene tetramine may be included in the aqueous or dry mixture, or it may be coated onto the formed felt; pressing one or more layers of the formed felt for 1-5 minutes to a controlled thickness and a controlled porosity at a temperature at which the resin melts, cross-links and then cures, such as 150° C.-200° C.; and heat treating the pressed felt in a substantially inert atmosphere, first to 750° C.-1000° C. and then to 1000° C.-3000° C.

32 Claims, No Drawings

ELECTRODE SUBSTRATE FOR ELECTROCHEMICAL CELL FROM CARBON AND CROSS-LINKABLE RESIN FIBERS

TECHNICAL FIELD

This disclosure relates to carbon composite electrode substrates for electrochemical cells, such as fuel cells, formed from a non-woven felt of chopped carbon fibers and chopped uncured cross-linkable resin fibers, prepared in either a dry-lay or wet-lay paper making process, pressed together and cured, the resin cross-linking to bind all of the fibers together, followed by heat treating to carbonize and to optionally partially graphitize the materials.

BACKGROUND ART

Porous carbon-carbon composites may be used as electrode substrates, which are also known as gas diffusion layers (GDL's), in a variety of electrochemical cells such as proton exchange membrane fuel cells, phosphoric acid fuel cells, direct methanol fuel cells, as the cathode in cells used to electrolyze water and as electronic conductors in a variety of batteries. The carbon-carbon composites are typically formed from a mixture of carbon fibers and a thermosetting resin. Some substrates may contain carbon or graphite powders in addition to the carbon fibers and thermosetting resins. A good example of the structure of a fuel cell substrate, and a process used to form these substrates, are shown in U.S. Pat. No. 4,851,304. A typical method of making a substrate consists of: (1) forming a non-woven felt from a chopped carbon fiber and a temporary binder by a wet-lay paper making process in an aqueous suspension, (2) impregnating the felt with a phenolic resin dissolved in a solvent, followed by solvent removal without curing the resin so as to form the prepreg, (3) pressing one or more layers of prepreged felt to obtain both a desired thickness and a desired porosity, at a temperature sufficient to cure the resin, (4) heat treating in an inert atmosphere to between 750-1000° C. to convert the phenolic resin to carbon and (5) heat treating in an inert atmosphere to between 2000-3000° C., which partially graphitizes the carbon, to improve thermal and electrical conductivities and to improve corrosion resistance.

The art as illustrated by the aforementioned patent is technically acceptable, but is unacceptably expensive. About sixteen percent of the cost of the aforementioned process is for impregnating the carbon fiber paper with phenolic resin. Attempts to add powdered phenolic resin into the paper-making process, have not been successful. This is partly due to the high resin content resulting in sticking of the felt to the rolls on the paper-making machine. The powdered resins migrate to the surface of the felt during the drying portion of the paper-making process. This results in a high surface concentration of resin which causes sticking. It is also partly due to the impossibility of removing all of the phenolic powder from the aqueous suspension, which leads to environmental problems.

SUMMARY

The disclosed process provides an electrode substrate at a lower cost, by eliminating the need for a resin impregnation step.

The elimination of resin impregnation is predicated on the realization that uncured, cross-linkable resin fibers commingled with carbon fibers will, when cured, cross link to sufficiently bind all of the fibers together, and is thereafter successfully heat treated to form carbon and optionally graphite. The resin fibers are intermingled with the carbon fibers which immobilizes them during the drying process, thus eliminating the high surface concentration of resin that causes sticking.

The process herein comprises (1) creating an aqueous or dry mixture of chopped carbon fibers and chopped cross-linkable resin fibers that are still fuseable after the felt is formed, (2) forming a non-woven felt from an aqueous or air suspension by a non-woven felt forming process, (3) pressing one or more layers of felt to a desired thickness and a desired porosity, at a temperature sufficient to melt, cross-link and cure the resin and (4) heat treating in an inert atmosphere.

The process may be performed by including a resin curing agent in the aqueous or dry mixture, or the process may preferably be performed by coating the formed felt with a solution of resin-curing agent before pressing the felt and curing the resin. This manner is preferred for several reasons. One reason is that less curing agent is required. An excess amount of curing agent must be included in the initial mixture to assure adequate curing agent even though various amounts of it are lost in the filtrate of the felt making process. In contrast, the curing agent solution diffuses quite well into the felt so the ratio of curing agent to resin is easily controlled for a proper cure, and excess amounts are therefore not wasted.

The process may be tailored by altering the length of carbon fibers and of the cross-linkable resin fibers to achieve desired properties.

Other improvements, features and advantages will become more apparent in the light of the following detailed description of exemplary embodiments.

MODE(S) OF IMPLEMENTATION

The electrode substrate disclosed herein, and the method of making it disclosed herein, may have varying characteristics and be produced from a variety of components and adjustable process steps. The carbon fibers may be conventional, being derived from polyacrylonitrile, rayon, pitch, mesophase-pitch, or phenolic-based carbon fibers, with nominal diameters of between 4 microns and 10 microns, the diameters being selected to tailor the properties of the substrate. The length of the carbon fiber or of the uncured resin fiber may be altered to effect the properties of the finished substrate. Chopped fibers are generally considered to be greater than 1 mm in length while milled fibers are typically less than 1 mm in length. Milled fibers will result in a structure with more isotropic properties whereas those made from chopped fibers will have more anisotropic properties. The fibers may be sized, for instance, to make them easier to disburse in the suspension used in the wet-lay process.

Any of the thermoplastic phenol-formaldehyde resins formed with an excess of phenol in the process are suitable for use in cross-linkable resin fibers herein. In addition to uncured novolac resin fibers, partially cured novolac resin fibers are acceptable as long as they have sufficient flow left to bond the carbon fibers together during the hot pressing step. A truly thermoplastic resin, which is not curable to a semi-solid state, is not acceptable. Uncured, cross-linkable fibers are available from a variety of sources. For instance, uncured novolac fibers are available from Nippon Kynol with nominal diameters of 10-15 microns, although smaller diameter novolac fibers are acceptable. The uncured novolac fibers are typically 1.5 mm-6 mm long and a mixture of lengths may be used either to support the manufacturing process (easier to disburse in the suspension) or to alter the characteristics of the final product.

The ratio of carbon fibers to uncured novolac fiber, by weight, is approximately 50:50 with a range of between 35:65 and 65:35 being acceptable for some substrate applications.

Novolac resins are any of the thermoset resins produced by the reaction between phenol and formaldehyde under acidic conditions with the formaldehyde quantity being insufficient to effect polymer cross-linking. Novolac resins are two-stage thermoset resins which are not self-reactive, and require a hardener or catalyst for curing (referred to herein as a "curing agent"), typically hexamethylene tetramine (referred to hereinafter as "hexa"). The novolac resins cross-link and cure in the presence of hexa at a temperature of about 150° C. to 200° C. Resole resins are one stage phenolic resins formed under alkaline conditions with excess formaldehyde. The residual formaldehyde reacts during the cure to form methylene bridge cross links. Partially cured resole resins and other single-stage phenolic resin fibers may be utilized in the process herein as long as the fibers are not fully cured and have sufficient flow left to bond the carbon fibers during the hot pressing step.

Alternatively, carbon or graphite powders may be added to the mixture of carbon fibers, uncured novolac fibers, a temporary binder and possibly the curing agent to effect the properties of the finished substrate. Other cross-linkable resin systems are acceptable. A resin system includes the resin and any commonly used curing agents. Suitable resin systems comprise epoxies, polyimides, polyesters, phenolics, polyurethanes, melamines and urea formaldehydes.

Novolac and resole phenolic resins are preferred for their high carbon yield of approximately 50% during the heat-treat process.

The ratio of uncured novolac fiber to hexa is typically about between 10:1 and 20:1 (by weight), but may be adjusted to permit melting and flow of the resin before the resin is cured within the selected temperature-time window. For continuous laminating processes, cure times of less than five minutes, and even less than one minute, are desirable. Higher hexa contents and higher cure temperatures are desirable for minimizing the cure time. The resin must cure during the hot pressing step to maintain the desired properties (thickness and porosity) during subsequent heat treating steps.

A temporary binder, such as polyvinyl alcohol, preferably in fiber form but acceptable in powdered form, is added to the mix of fibers and hexa, with a ratio of temporary binder to the sum of the carbon fibers and uncured novolac fibers being approximately 1:10 (by weight). However, other temporary binders and the concentration of temporary binders may be selected to provide acceptable strength throughout the paper-making process. The temporary binder must be one which is decomposed or converted to carbon during the heat treating processes A preferred process includes creating, in a high shear mixer, an aqueous suspension of chopped carbon fibers, chopped uncured novolac fibers, and a temporary binder such as polyvinyl alcohol fiber or powder, with or without a resin curing agent such as powdered hexa. Then forming a non-woven felt from the aqueous suspension by a wet-lay paper making process, de-watering the felt by a combination of removing water by gravity and removing water by vacuum against the wire screen, and drying the felt by heating the felt at a sufficiently low felt temperature, such as between 75° C. and 125° C. so that the resin does not cross link.

If the curing agent is not included in the aqueous suspension, the felt is coated with a solution of a resin curing agent at this point in the process by means of a conventional in-line coater. Then, one or more layers of the felt are pressed to a desired thickness and a desired porosity at a temperature sufficient to melt and then cross link and cure the resin, such as between 150° C. and 200° C., for a time of between about one minute and about five minutes. For instance, a single layer may provide a thin, highly porous substrate, while several layers may provide a thicker porous substrate or a thin substrate of low porosity, depending on pressure. Thickness and porosity of the substrate are tailored to the intended application, as is known. The substrate is then heat treated in an inert atmosphere to convert the phenolic resin to carbon, at a temperature between about 750° C. and 1000° C. The substrate may be further heat treated in an inert atmosphere to partially graphitize the materials, at a temperature between about 1000° C. and about 3000° C., or preferably between about 2500° C. and about 3000° C., to improve electrical and thermal conductivity and corrosion resistance.

However, a dry process may be used wherein a dry blend of chopped carbon fibers, chopped cross-linkable resin fibers, and a temporary binder, such as polyvinyl alcohol powder, or preferably polyvinyl alcohol fiber, with or without a curing agent, such as powdered hexa, is formed into a non-woven felt from a fluidized stream of the dry powder blend in a dry-lay non-woven felt forming process. If the curing agent was not in the dry blend, the felt is coated with a solution of curing agent by means of a conventional in-line coater. The further steps of heating the felt at a temperature below a cross-linking temperature, pressing, and heat treating, follow, as described hereinbefore. In both the wet and dry processes, various cross-linkable resin systems referred to hereinbefore may be used, although novalac and resole phenolic resins are preferred for their high carbon yield of approximately 50% during the heat treating process.

The invention claimed is:

1. A fuel cell electrode substrate comprising a pressed non-woven felt, including carbon fibers and initially uncured, cross-linkable resin fibers which, during a combined heating and pressing step, have become cured, cross-linked and bind the carbon fibers together, the resin being partially carbonized.

2. A substrate according to claim 1 further characterized by:
said pressed non-woven felt consisting of between 65% and 35%, by weight, carbon fibers and between 35% and 65%, by weight, resin fibers cross-linked and binding the carbon fibers together.

3. A method of making a fuel cell electrode substrate characterized by:
(a) creating an aqueous or dry mixture of carbon fibers, fibers of a cross-linkable resin that are still fuseable and a temporary binder, either (i) with or (ii) without a resin curing agent;
(b) forming a non-woven felt from either an aqueous suspension of the aqueous mixture or an air suspension of the dry mixture, by a non-woven, wet-lay or dry-lay, respectively, felt forming process; and
(c) if the mixture in said step (a) does not contain a resin curing agent, coating said felt with a solution of a resin curing agent after said step (b);
(d) pressing one or more layers of the formed felt to a controlled thickness and controlled porosity at a temperature at which the resin melts, cross-links and then cures; and
(e) heat treating the pressed felt in a substantially inert atmosphere.

4. A method according to claim 3 further characterized in that:
the mixture of said step (a) contains a resin curing agent, and said step (c) is not performed, 5. A method according to claim 4 further characterized by:
performing said step (a) with hexamethylene tetramine as the resin curing agent.

6. A method according to claim 3 further characterized in that:
the mixture of said step (a) does not contain a resin curing agent, and said step (c) is performed.

7. A method according to claim 6 further characterized by:
performing said step (c) with hexamethylene tetramine as the resin curing agent.

8. A method according to claim 6 further characterized in that:
said step (c) is performed with a conventional in-line coater.

9. A method according to claim 3 further characterized by:
said step (d) being carried out at a temperature between about 150° C. and about 200° C.

10. A method according to claim 3 further characterized by:
said step (d) extends for between 1 minute and 5 minutes.

11. A method according to claim 3 further characterized by:
said step (e) being performed at a temperature between about 750° C. and about 1000° C.

12. A method according to claim 3 further characterized by:
said step (e) being first performed at a temperature between about 750° C. and about 1000° C. to convert the resin to carbon and being thereafter performed at a temperature between about 1000° C. and about 3000° C. to partially graphitize the carbonized resin.

13. A method according to claim 3 further characterized by:
performing said step (a) with polyvinyl alcohol as the temporary binder.

14. A method according to claim 3 further characterized by:
said step (a) creates an aqueous mixture; and
said step (b) includes dewatering the mixture.

15. A method according to claim 14 further characterized by:
said step (b) includes dewatering the mixture by a process selected from (i) removing water by gravity and (ii) removing water by suction or both (i) and (ii).

16. A method according to claim 3 further characterized in that:
said resin is selected from uncured novolac resin, partially cured novolac resin, uncured resole resin, other phenolics which are still fusible after the felt is formed, epoxies, polymides, polyesters, polyurethanes, melamines and urea formaldehydes.

17. A method according to claim 3 further characterized in that:
said mixture is created in step (a) with carbon powder as an additive.

18. A method according to claim 3 further characterized by:
said mixture is created in step (a) with graphite powder as an additive.

19. A method of making a fuel cell electrode substrate characterized by:
(a) creating an aqueous suspension consisting of carbon fibers, uncured novolac fibers and a temporary binder, (i) with or (ii) without a resin curing agent;
(b) forming a non-woven felt from the suspension by a wet-lay paper making process;
(c) dewatering the felt by (i) removing water by gravity or (ii) removing water by suction, or both (i) and (ii);
(d) drying the felt by heating the felt at a temperature sufficiently low so the resin does not cross link;
(e) if the mixture in said step (a) does not contain a resin curing agent, coating said felt with a solution of a resin curing agent after said step (d);
(f) pressing one or more layers of the formed felt at a temperature of between about 150° C. and about 200° C. for between about 1 minute and about 5 minutes to cross link and to provide desired thickness and desired porosity; and
(g) heat treating the pressed felt in an inert atmosphere to between about 750° C. and about 1000° C. to convert at least some of the cured resin to carbon.

20. A method according to claim 19 further characterized in that:
the mixture of said step (a) contains a resin curing agent, and said step (e) is not performed.

21. A method according to claim 20 further characterized by:
performing said step (a) with hexamethylene tetramine as the resin curing agent.

22. A method according to claim 19 further characterized in that:
the mixture of said step (a) does not contain a resin curing agent, and said step (e) is performed.

23. A method according to claim 22 further characterized by:
performing said step (e) with hexamethylene tetramine as the resin curing agent.

24. A method according to claim 22 further characterized in that:
said step (e) is performed with a conventional in-line coater.

25. A method according to claim 19 further characterized in that:
after step (g), heat treating in an inert atmosphere to between about 1000° C. and about 3000° C. to partially graphitize the carbonized resin fibers.

26. A method according to claim 19 further characterized in that:
said suspension is created in said step (a) with polyvinyl alcohol as the binder.

27. A method according to claim 19 further characterized in that:
said suspension is created in said step (a) with hexamethylene tetramine as the resin curing agent.

28. A method according to claim 19 further characterized in that:
said felt is dried in said step (d) at a temperature between about 75° C. and about 125° C.

29. A method according to claim 19 further characterized in that:
said suspension is created in step (a) with carbon powder as an additive.

30. A method according to claim 19 further characterized in that:
said suspension is created in step (a) with graphite powder as an additive.

31. A fuel cell electrode substrate made by the method of claim 3.

32. A fuel cell electrode substrate made by the method of claim 19.

* * * * *